United States Patent
Yadav

(10) Patent No.: US 11,386,650 B2
(45) Date of Patent: Jul. 12, 2022

(54) METHOD, APPARATUS, AND SYSTEM FOR DETECTING AND MAP CODING A TUNNEL BASED ON PROBES AND IMAGE DATA

(71) Applicant: HERE Global B.V., Eindhoven (NL)

(72) Inventor: Ashish Deepchand Yadav, Mumbai (IN)

(73) Assignee: HERE Global B.V., Eindhoven (NL)

( * ) Notice: Subject to any disclaimer, the term of this patent is extended or adjusted under 35 U.S.C. 154(b) by 7 days.

(21) Appl. No.: 17/115,554

(22) Filed: Dec. 8, 2020

(65) Prior Publication Data

US 2022/0180099 A1    Jun. 9, 2022

(51) Int. Cl.
G06V 20/10 (2022.01)
G06V 10/20 (2022.01)
G06K 9/62 (2022.01)

(52) U.S. Cl.
CPC ......... G06V 20/182 (2022.01); G06K 9/6256 (2013.01); G06V 10/20 (2022.01)

(58) Field of Classification Search
CPC ..... G06V 20/182; G06V 10/20; G06K 9/6256
See application file for complete search history.

(56) References Cited

U.S. PATENT DOCUMENTS

| | | | |
|---|---|---|---|
| 6,658,352 B2 | 12/2003 | Abe et al. | |
| 9,366,764 B2 | 6/2016 | Sun et al. | |
| 9,558,660 B1* | 1/2017 | Fowe | G08G 1/0112 |
| 10,304,331 B2 | 5/2019 | Fowe et al. | |
| 10,373,077 B2 | 8/2019 | Rajani et al. | |
| 2006/0159309 A1* | 7/2006 | Tsukamoto | B60Q 1/1423 |
| | | | 382/104 |
| 2007/0024467 A1* | 2/2007 | Fujii | G06V 20/38 |
| | | | 340/937 |

(Continued)

FOREIGN PATENT DOCUMENTS

EP    1983303 A1    10/2008

OTHER PUBLICATIONS

Aly et al., "Automatic Rich Map Semantics Identification Through Smartphone-Based Crowd-Sensing", Published in: IEEE Transactions on Mobile Computing ( vol. 16, Issue: 10, Oct. 1, 2017), publication date: Dec. 26, 2016, pp. 1-14.

(Continued)

*Primary Examiner* — Ming Y Hon
(74) *Attorney, Agent, or Firm* — Ditthavong, Steiner & Mlotkowski

(57) ABSTRACT

An approach is provided for detecting and map-coding a tunnel based on probes and image data. The approach involves, for example, identifying a gap in probe data collected from one or more location sensors of a plurality vehicles. The gap represents a probe gap segment along which at least one probe point of the probe data does not occur or occurs below a threshold number. The approach also involves retrieving image data depicting a geographic area based on location coordinate data associated with the gap. The approach further involves processing the image data to identify one or more end points of a road network depicted in the image data. The approach further involves locating a tunnel start point and/or a tunnel end point based on the one or more endpoints. The approach further involves providing the tunnel start point and/or the tunnel end point as a map data output.

20 Claims, 17 Drawing Sheets

(56) References Cited

U.S. PATENT DOCUMENTS

| | | | | |
|---|---|---|---|---|
| 2014/0184798 | A1* | 7/2014 | Wedajo | G06V 20/56 |
| | | | | 348/148 |
| 2015/0073705 | A1* | 3/2015 | Hiwatashi | G01C 21/3602 |
| | | | | 701/468 |
| 2016/0146616 | A1* | 5/2016 | Ren | G01C 21/30 |
| | | | | 701/409 |
| 2016/0229331 | A1* | 8/2016 | Adachi | B60Q 1/143 |
| 2017/0023678 | A1* | 1/2017 | Pink | G01S 17/42 |
| 2017/0197656 | A1* | 7/2017 | Oh | B62D 6/007 |
| 2018/0012374 | A1* | 1/2018 | Fujita | H04N 5/235 |
| 2019/0161087 | A1* | 5/2019 | Kawabe | B60W 40/02 |
| 2019/0163993 | A1* | 5/2019 | Koo | G06V 20/588 |
| 2019/0378315 | A1* | 12/2019 | Oshikiri | G06T 11/20 |
| 2021/0223211 | A1* | 7/2021 | Fujii | H04W 4/80 |
| 2021/0335132 | A1* | 10/2021 | Zhang | G06V 20/582 |
| 2021/0374412 | A1* | 12/2021 | Cerri | G06V 20/584 |

OTHER PUBLICATIONS

Ghasemloo et al., "Road and Tunnel Extraction from SPOT Satellite Images Using Neural Networks", Published Online Feb. 2013, Journal of Geographic Information System, 2013, 5, pp. 69-74.

\* cited by examiner

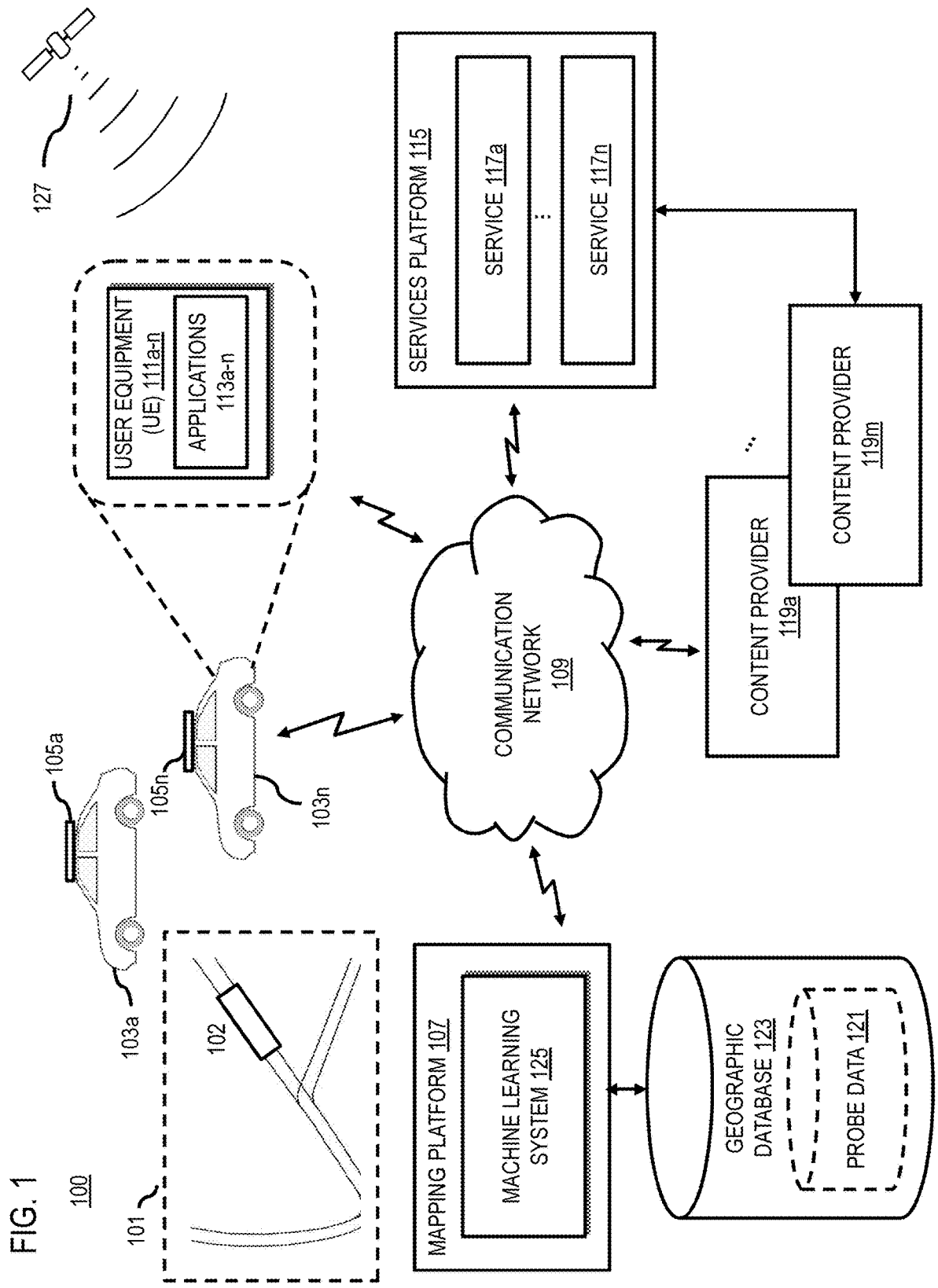

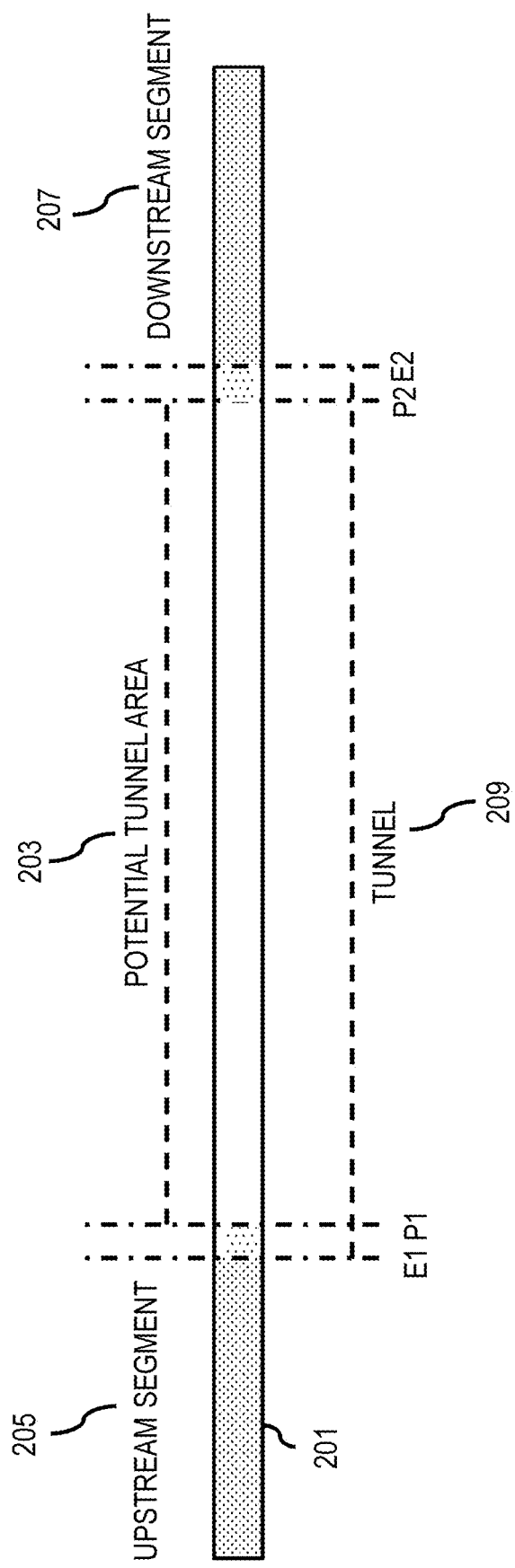

400

500

520

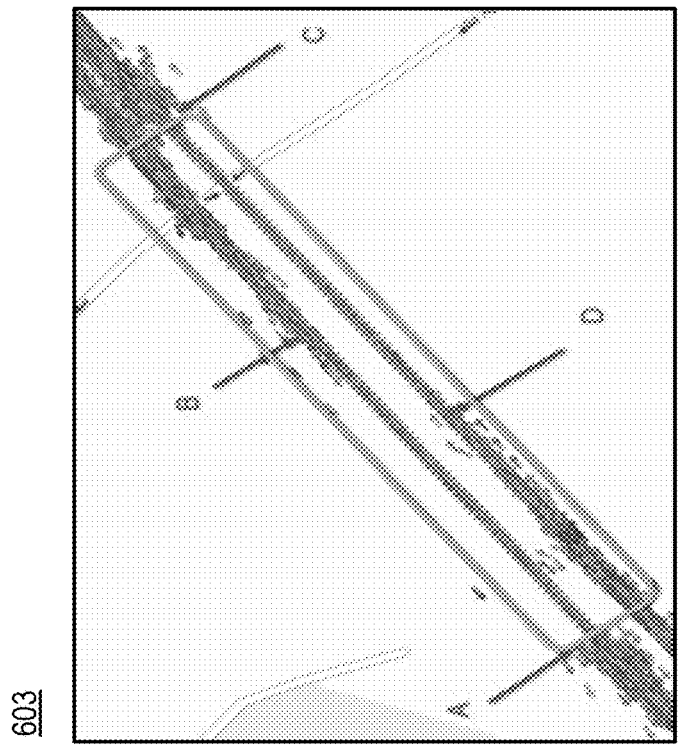
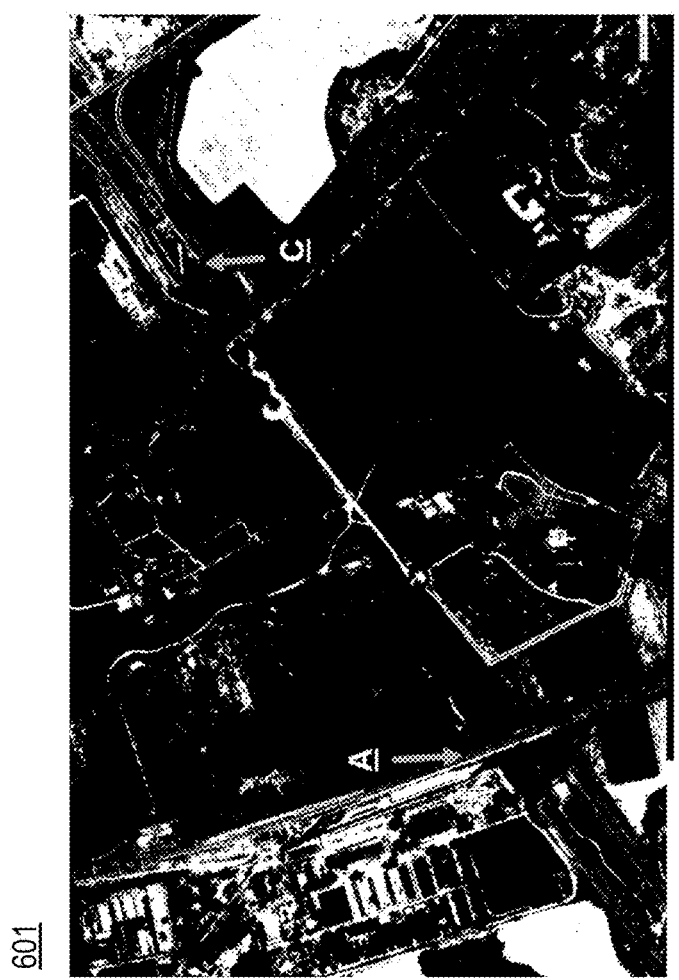
FIG. 6B

800

METHOD, APPARATUS, AND SYSTEM FOR DETECTING AND MAP CODING A TUNNEL BASED ON PROBES AND IMAGE DATA

BACKGROUND

Location-based service providers (e.g., mapping and navigation providers) are continually challenged to provide compelling services and applications. One area of development relates to providing users navigation support when traveling on a road network. Providing accurate map data is a key aspect of providing such support. Tunnels (e.g., a road tunnel, a railroad tunnel, etc.) are a common map feature and their features or characteristics (e.g., width, height, and length) can significantly affect traffic flows; hence they need to be accurately coded in maps (e.g., digital maps). However, accurate tunnel feature data is often difficult and/or expensive to obtain (e.g., due to manual input requirements, computation resource requirements, etc.). Accordingly, mapping service providers face significant technical challenges to efficiently and accurately detect and code tunnels and their attributes.

SOME EXAMPLE EMBODIMENTS

Therefore, there is a need for an approach for efficiently and accurately detecting and map-coding tunnels.

According to one embodiment, a method comprises identifying a gap in probe data collected from one or more location sensors of a plurality vehicles. The gap represents a probe gap segment along which at least one probe point of the probe data does not occur or occurs below a threshold number. The method also comprises retrieving image data depicting a geographic area based on location coordinate data associated with the gap. The method further comprises processing the image data to identify one or more end points of a road network depicted in the image data. The method further comprises locating a tunnel start point, a tunnel end point, or a combination thereof based on the one or more endpoints. The method further comprises providing the tunnel start point, the tunnel end point, or a combination thereof as a map data output.

According to another embodiment, an apparatus comprising at least one processor, and at least one memory including computer program code, the at least one memory and the computer program code configured to, with the at least one processor, cause the apparatus to identify a gap in probe data collected from one or more location sensors of a plurality vehicles. The gap represents a probe gap segment along which at least one probe point of the probe data does not occur or occurs below a threshold number. The apparatus is also caused to retrieve image data depicting a geographic area based on location coordinate data associated with the gap. The apparatus is further caused to process the image data to identify one or more end points of a road network depicted in the image data. The apparatus is further caused to locate a tunnel start point, a tunnel end point, or a combination thereof based on the one or more endpoints. The apparatus is further caused to provide the tunnel start point, the tunnel end point, or a combination thereof as a map data output.

According to another embodiment, a computer-readable storage medium carrying one or more sequences of one or more instructions which, when executed by one or more processors, cause an apparatus to identify a gap in probe data collected from one or more location sensors of a plurality vehicles. The gap represents a probe gap segment along which at least one probe point of the probe data does not occur or occurs below a threshold number. The apparatus is also caused to retrieve image data depicting a geographic area based on location coordinate data associated with the gap. The apparatus is further caused to process the image data to identify one or more end points of a road network depicted in the image data. The apparatus is further caused to locate a tunnel start point, a tunnel end point, or a combination thereof based on the one or more endpoints. The apparatus is further caused to provide the tunnel start point, the tunnel end point, or a combination thereof as a map data output.

According to another embodiment, an apparatus comprises means for identifying a gap in probe data collected from one or more location sensors of a plurality vehicles. The gap represents a probe gap segment along which at least one probe point of the probe data does not occur or occurs below a threshold number. The apparatus also comprises means for retrieving image data depicting a geographic area based on location coordinate data associated with the gap. The apparatus further comprises means for processing the image data to identify one or more end points of a road network depicted in the image data. The apparatus further comprises means for locating a tunnel start point, a tunnel end point, or a combination thereof based on the one or more endpoints. The apparatus further comprises means for providing the tunnel start point, the tunnel end point, or a combination thereof as a map data output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system for detecting and map-coding a tunnel based on probes and image data, according to one embodiment;

FIG. 2A is a diagram illustrating an example tunnel area, according to one embodiment;

FIG. 6B is a diagram illustrating an example binary aerial image and a probe data image, according to one embodiment;

DESCRIPTION OF SOME EMBODIMENTS

Figure 2B:
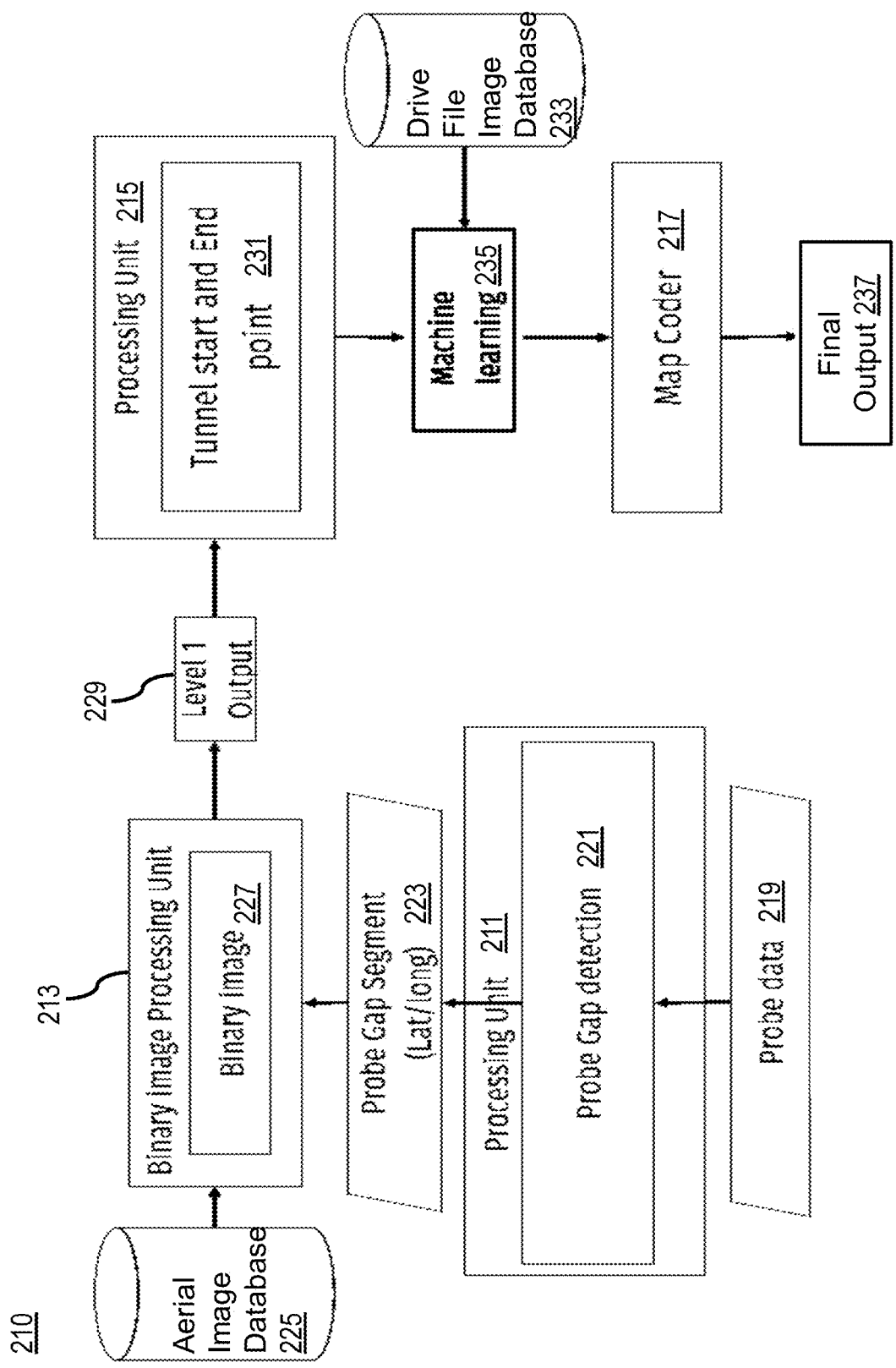
FIG. 2B is a diagram of a process flow for detecting and map-coding a tunnel based on probes and image data, according to one embodiment.

Examples of a method, apparatus, and computer program for detecting and map-coding a tunnel based on probes and image data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system for detecting and map-coding a tunnel based on probes and image data, according to one embodiment. As described above, location-based service providers (e.g., mapping and navigation providers) are continually challenged to provide compelling services and applications. One area of development relates to providing users navigation support when traveling on a road or a road network. Providing accurate map data is a key aspect of providing such support. Tunnels (e.g., a road tunnel, a railroad tunnel, etc.) are a common map feature and their features or characteristics (e.g., width, height, and length) can significantly affect traffic flows; hence they need to be accurately coded in maps (e.g., digital maps). For example, tunnels can enable travel through an otherwise impassible structure such as a mountain or hill. By way of illustration and not limitation, a tunnel may include any enclosure, structure or the like that encompasses a passageway that is dug through the surrounding soil/earth/rock and enclosed except for at least one entrance at one end and at least one exit at another end.

However, obtaining accurate tunnel feature data is often difficult and/or expensive (e.g., due to manual input requirements, computation resource requirements, etc.). For instance, it can be difficult to detect tunnel locations and/or features simply using images. For example, raster/aerial/satellite images alone often cannot provide sufficient information for tunnel detection and coding. Some tunnel mapping processes can detect a tunnel using video drive files, and then code the tunnel manually. However, these manual processes can be time consuming and susceptible to human errors. Some other tunnel mapping processes can extract tunnel locations from satellite images. However, this extraction process can require significant computation resources and often lacks tunnel height and other information. Accordingly, mapping service providers face significant technical challenges to efficiently and accurately detect and code tunnels and their attributes.

To address these problems, the system 100 of FIG. 1 introduces a capability to detect and map-code a tunnel in a road network based on probes and image data. In one embodiment, the system 100 can process probe data using computer software to tag a location where there is an abrupt end of probe signals at an end point of a tunnel. In another embodiment (closer to reality), the probe signal may end gradually, instead of abruptly.

A probe point can include attributes such as: (1) source ID, (2) longitude, (3) latitude, (4) elevation, (5) heading, (6) speed, (7) time, and (8) access type. A source/probe can be a vehicle, a drone, a user device travelling with the vehicle, etc. Each of the probe points where probe data is captured is associated with the same probe/source identifier. As such, any probe data captured in connection with the same probe identifier is associated with the same segment of roadway/link, tunnel, geographic location, time interval, vehicle/driver, etc. Probe data can be used to define probe (e.g., a vehicle) travel paths, count numbers of contributing vehicles, form "drives" by a location point (together with time information), etc. This property of probe data transmission can result in discontinuity and lack of probe data from vehicles in the potential tunnel segment. When analyzing the probe data of multiple hours/days/weeks/months/ etc., the system 100 can identify a break/gap in probe data on a streamline probe signal in a road or a road network 101, which is a significant indication of the presence of a tunnel 102 that can restrict the sensor and/or communication signal transmission between vehicle probes and a satellite/communication tower. This helps the system 100 to tag the presence of the tunnel 102 in a map (e.g., a digital map).

FIG. 2A is a diagram illustrating an example tunnel area, according to one embodiment. FIG. 2A depicts that probe point densities are often affected by the presence of a potential tunnel segment where a tunnel interferes/blocks sensor and/or communication signals (e.g., global positioning system (GPS)/wireless signals) emitted by probes traveling through the tunnel. By way of example, FIG. 2A shows a road segment 201 including a potential tunnel segment 203 (with little or no probe points) sandwiched between a upstream road segment 205 and a downstream road segment 207, both the upstream road segment 205 and the downstream road segment 207 with a relatively greater number of probe points. FIG. 2A also shows locations P1 and P2 that are the ends of probe signals as end points E1 and E2 of the potential tunnel segment 203, respectively.

The system 100 can use the location coordinates of the tagged locations P1 and P2 to get raster/aerial/satellite imagery of the area including the potential tunnel area (e.g., the potential tunnel segment 203), and to create a binary image (consisting of pixels with one of exactly two colors, usually black and white) derived from the raster/aerial/satellite imagery to increase processing efficiency. In one instance, the raster/aerial/satellite imagery may be stored in or accessible by the system 100 in geographic information systems (GIS) databases, satellite imagery access hubs, etc. The system 100 can compare the tagged locations P1 and P2 with the binary image using (e.g., heuristics, rules, machine learning, etc.) to identify ends of a road network (e.g., the road segment 201) as ends E1 and E2 of the tunnel 209. In another embodiment, the system 100 can use the location coordinates of the tagged locations to get a drive file image (e.g., stored in or accessible by a GIS database, a satellite imagery access hub, etc.) to verify the existence of the tunnel 209. By way of example, a video drive file can be captured by a vehicle camera, a traffic reporting camera, etc.

FIG. 2B is a diagram of a process flow 210 for detecting and map-coding a tunnel based on probes and image data, according to one embodiment. For instance, the system 100 can include a first processing unit 211, a binary image processing unit 213, a second processing unit 215, and a map coder 217. In one instance, the process flow 210 starts with the processing unit 211 retrieving probe data 219 (e.g., collected for 24 hours, 72 hours, etc.) for probe gap detection 221 similar to what was described in conjunction with FIG. 2A, and obtaining the end coordinates of a probe gap segment 223 (e.g., latitude (Lat)/longitude(Long)). The binary image processing unit 213 can retrieve imagery data from an aerial image database 225 based on the end coordinates of the probe gap segment 223, and then convert the imagery data into a binary image 227. In one instance, the binary image processing unit 213 can compare the end coordinates of the probe gap segment 223 with a road network in the binary image 227 to get a Level 1 output 229. A tunnel exists where there is no probe data (e.g., probe data blocked by the tunnel structure) or a road segment ends at a structure entrance and resumes at an exit of the structure in an aerial image. The Level 1 output 229 is a preliminary output of the process flow 210 and includes preliminary end points of a tunnel that can be verified/confirmed with one or more other image sources. The processing unit 215 can determine precise end points 231 of a tunnel based on the Level 1 output 229. In addition, the processing unit 215 can use the precise tunnel end points 231 to retrieve one or more drive images of the tunnel from a drive file image database 233. The processing unit 215 can then apply machine learning 235 to compare the precise tunnel end points 231 with the tunnel images of a drive file to verify/confirm the tunnel existence and to detect various tunnel attributes (e.g., height, width, restriction, etc.). The map coder 217 can code the tunnel and its attributes in a map (e.g., a digital map), a geographic database, etc. as a final output 237.

In one embodiment, the system 100 can process sensor data from one or more vehicles 103a-103n (also collectively referred to as vehicles 103) (e.g., standard vehicles, autonomous vehicles, heavily assisted driving (HAD) vehicles, semi-autonomous vehicles, etc.). In one instance, the vehicles 103 include one or more vehicle sensors 105a-105n (also collectively referred to as vehicle sensors 105) (e.g., positioning sensors) and have connectivity to a mapping platform 107 via a communication network 109. In one embodiment, the sensor data includes probe data which can be reported (e.g., by the vehicles 103) as probe points, which are individual data records collected at a point in time that records telemetry data for that point in time.

In one embodiment, the system 100 can also collect probe data from one or more user equipment (UE) 111a-111n (also collectively referred to herein as UEs 111) associated with the vehicles 103 (e.g., an embedded navigation system), a user or a passenger of a vehicle 103 (e.g., a mobile device, a smartphone, etc.), or a combination thereof. In one instance, the UEs 111 may include one or more applications 113a-113n (also collectively referred to herein as applications 113) (e.g., a navigation or mapping application). In one embodiment, the system 100 may also collect the probe data from one or more other sources such as government/municipality agencies, local or community agencies (e.g., police departments), and/or third-party official/semi-official sources (e.g., the services platform 115, one or more services 117a-117n, one or more content providers 119a-119m, etc.). In one instance, the probe data collected by the vehicle sensors 105, the UEs 111, one or more other sources, or a combination thereof may be stored in a probe data layer 121 of a geographic database 123, the geographic database 123 or a combination thereof.

Figure 3:
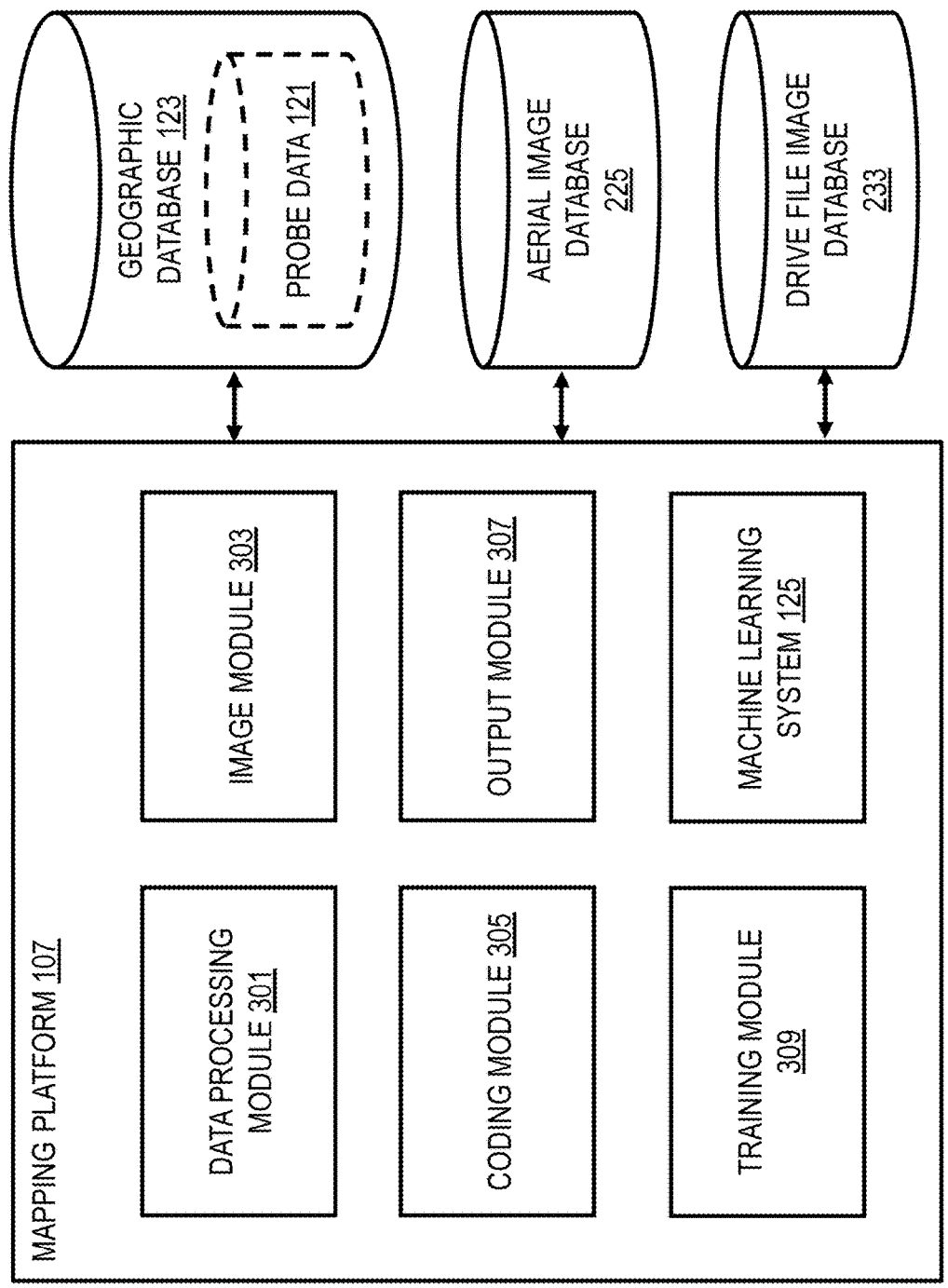
FIG. 3 is a diagram of the components of a mapping platform, according to one embodiment.

FIG. 3 is a diagram of the components of a mapping platform configured to detect and map-code a tunnel based on probes and image data, according to one embodiment. By way of example, the mapping platform 107 includes one or more components for detecting and map-coding a tunnel based on probes and image data, according to the various embodiments described herein. It is contemplated that the functions of these components may be combined or performed by other components of equivalent functionality. In one embodiment, the mapping platform 107 includes an data processing module 301, an image module 303, a coding module 305, an output module 307, a training module 309, and a machine learning system 125, and has connectivity to the geographic database 123, which includes the probe data layer 121, the aerial image database 225, and the drive file image database 233. The above presented modules and components of the mapping platform 107 can be implemented in hardware, firmware, software, or a combination thereof. Though depicted as a separate entity in FIG. 1, it is contemplated that the mapping platform 107 may be implemented as a module of any other component of the system 100. In another embodiment, the mapping platform 107 and/or the modules 301-309 may be implemented as a cloud-based service, local service, native application, or combination thereof. The functions of the mapping platform 107, the machine learning system 125, and/or the modules 301-309 are discussed with respect to FIGS. 4-9.

Figure 4:
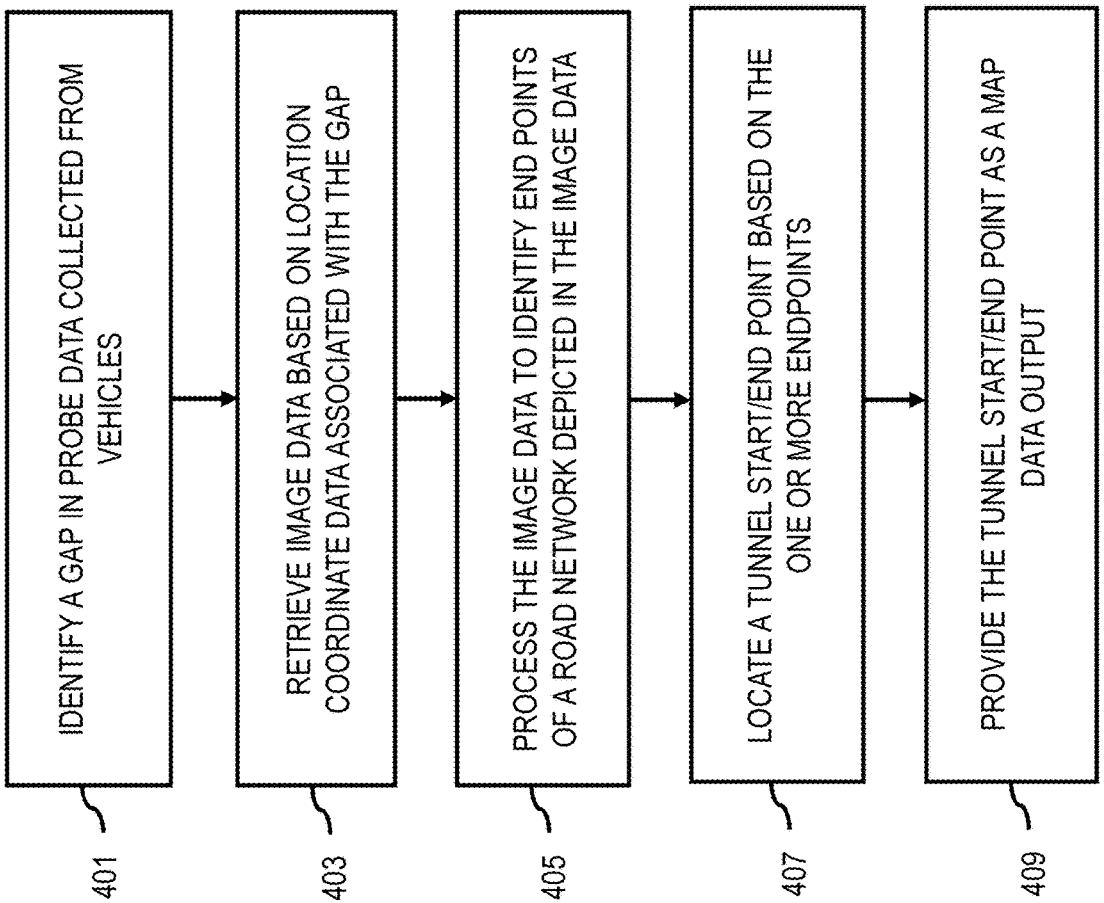
FIG. 4 is a flowchart of a process for detecting and map-coding a tunnel based on probes and image data, according to one embodiment.
Figure 12:
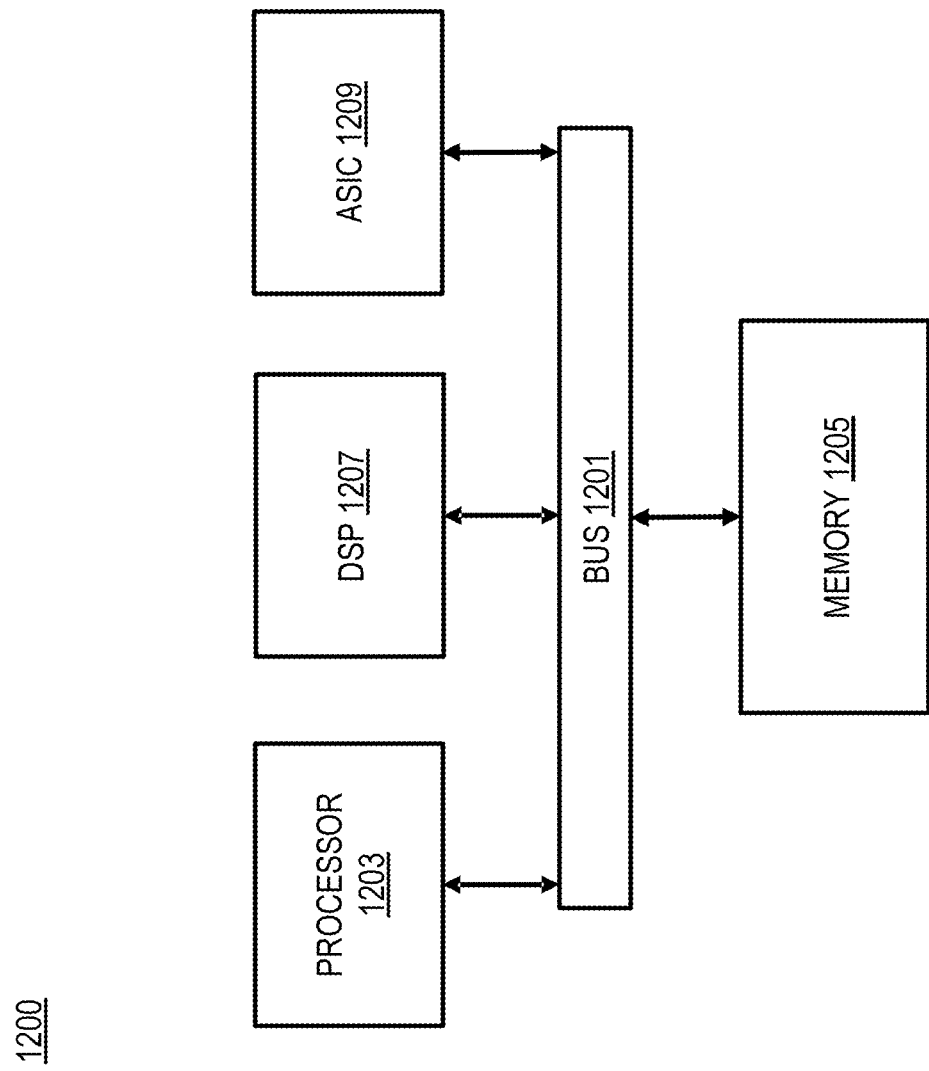
FIG. 12 is a diagram of a chip set that can be used to implement an embodiment.

FIG. 4 is a flowchart of a process for detecting and map-coding a tunnel based on probes and image data, according to one embodiment. In various embodiments, the mapping platform 107, the machine learning system 125, and/or any of the modules 301-309 may perform one or more portions of the process 400 and may be implemented in, for instance, a chip set including a processor and a memory as shown in FIG. 12. As such, the mapping platform 107, the machine learning system 125, and/or the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In one embodiment, the data processing module 301 can aggregate probe data gathered and/or generated by probes resulting from the driving of multiple different vehicles through a given tunnel.

In one embodiment, in step 401, the data processing module 301 can identify a gap in probe data collected from one or more location sensors of a plurality vehicles. For instance, the gap can represent a probe gap segment along which at least one probe point of the probe data does not occur or occurs below a threshold number. For example, the identification of the probe gap segment may be due to a structure (e.g., a tunnel) interfering or blocking the transmission of the probe data from one or more of the plurality of vehicles (e.g., vehicles 103) traveling along a road network (e.g., the road network 101). In one embodiment, the data processing module 301 can identify a start point of the probe gap segment based on determining a first location at which a transmission of the probe data ends, and identify an end point of the probe gap segment based on determining a second location at which the transmission of the probe data resumes. In one instance, the one or more location sensors (e.g., vehicle sensors 105) may include positioning sensors, GPS sensors, etc. and the plurality of vehicles (e.g., vehicles 103) may include standard vehicles, autonomous vehicles, semi-autonomous vehicles, HAD vehicles, etc.

Figure 5A:
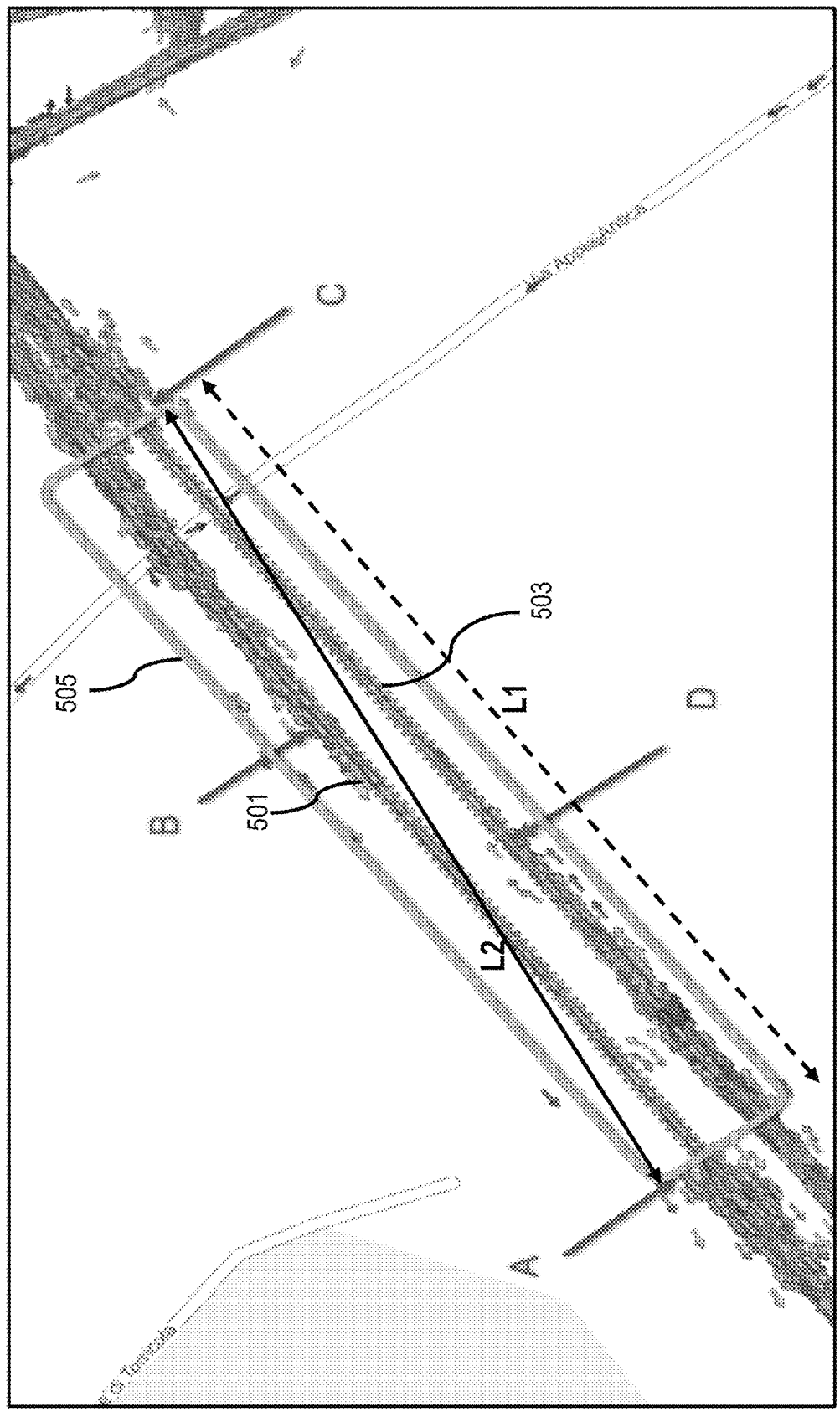
FIG. 5A is a diagram illustrating an example one-way probe gap segments, according to one embodiment.
Figure 5B:
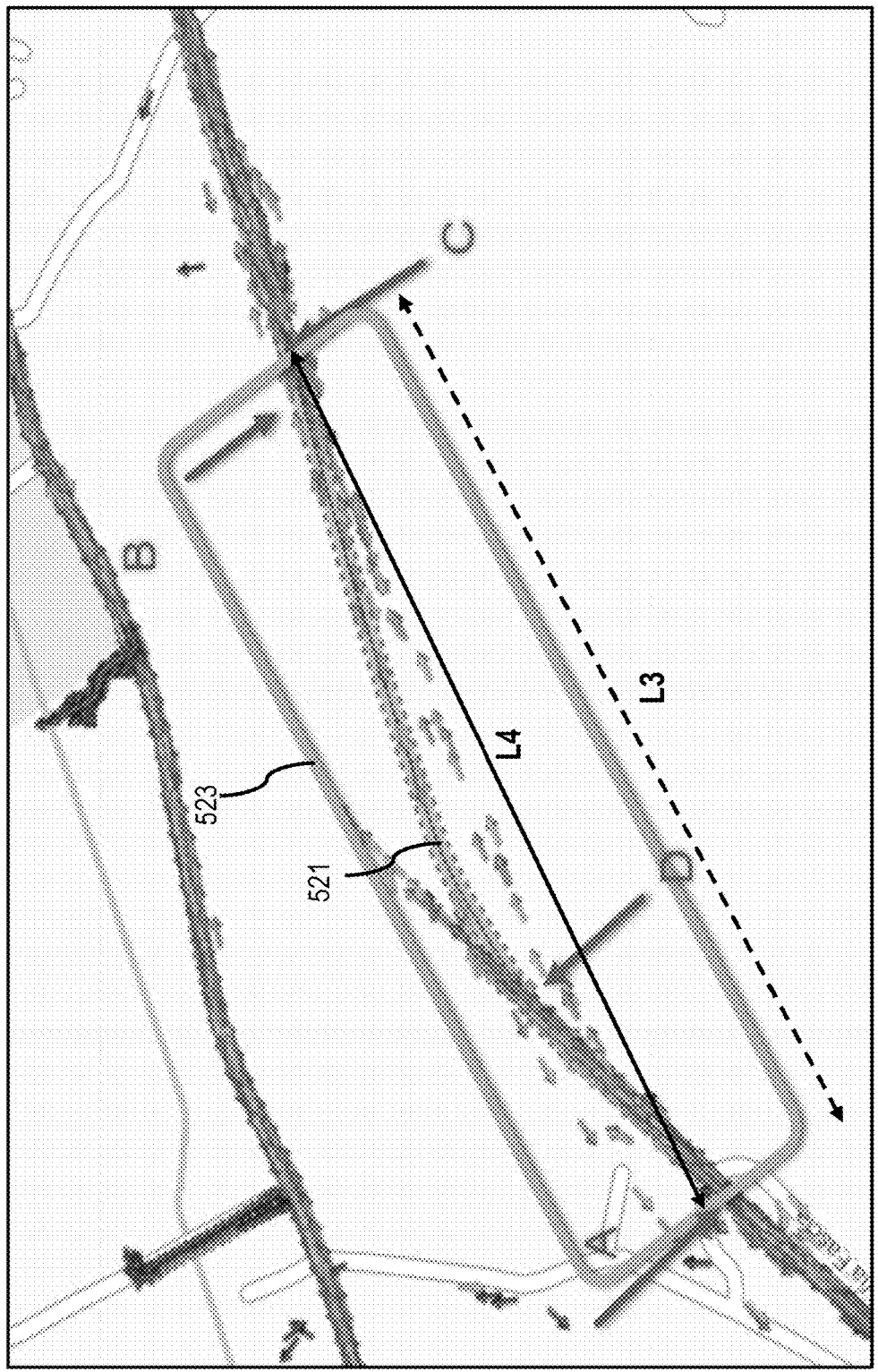
FIG. 5B is a diagram illustrating an example two-way probe gap segment, according to one embodiment.

FIGS. 5A and 5B are diagrams illustrating example probe gap segments in streamline probe data, according to various embodiments. In one instance, there should be no signal/probe data while a vehicle (e.g., a vehicle 103) is travelling inside a tunnel, and the signal transmission should resume when the vehicle exits the tunnel. However, multipath propagation of the probe data/signals (reaching receivers by two or more paths) can cause multipath interference (e.g., reflection). Consequently, the distinction between no sign/probe data and signal transmission is not always clear, which can lead to data errors. FIGS. 5A and 5B show that such errors can be more impactful when vehicles enter a tunnel compared to exit a tunnel. For instance, FIG. 5A is a diagram 500 illustrating an one-way probe gap segment 501 (the vehicular traffic heading in a south-west direction) and another one-way probe gap segment 503 (the vehicular traffic heading in a north-east, opposite direction), according to one embodiment.

In this example, the exit end "A" of the probe gap segment 501 has an abrupt break in the streamline probe data, while the entry end "B" of the probe gap segment 501 has a relatively ambiguous break in the streamline probe data. Similarly, the exit end "C" of the probe gap segment 503 has an abrupt break in the streamline probe data, while the entry end "D" of the probe gap segment 503 has a relatively ambiguous break in the streamline probe data. By way of example, the data processing module 301 can use exit ends "A" and "C" of probe gap segments 501 and 503, respectively, in FIG. 5A (i.e., the first point where a signal resumes after a transmission loss in a driving direction) to decide a length of an image (e.g., an aerial/satellite/raster image of an area of interest 505 including the probe gap segments) as 130% of a length "L1" of the area 505 to be requested for further processing. The addition 30% of length is chosen as an example to ensure enough image margins to determine the ends of the tunnel. As another example, an aerial/satellite/raster image length/size=a distance "L2" between Lat/Long of "A" and Lat/Long "C"+20% of the distance between Lat/Long of A and Lat/Long C.

In another instance, a diagram 520 of FIG. 5B illustrates an example of a two-way probe gap segment 521 with a first lane heading in a south-west direction and a second lane heading in a north-east, opposite direction, according to one embodiment. The exit end "A" of the first lane has an abrupt break in the streamline probe data, while the entry end "B" of the first lane has a relatively ambiguous break in the streamline probe data. Similarly, the exit end "C" of the second lane has an abrupt break in the streamline probe data, while the entry end "D" of the second lane has a relatively ambiguous break in the streamline probe data. By analogy, the data processing module 301 can use exit ends "A" and "C" of the first and second lanes in FIG. 5B to decide a length of an image (e.g., an aerial/satellite/raster image of an area 523 of interest including the probe gap segment 521) as 125% of a length "L3" of the area 523 to be requested for further processing. Like FIG. 5A, the additional 25% of length is chosen as an example to ensure enough image margins to determine the ends of the tunnel. As another example, an aerial/satellite/raster image length/size=a distance "L4" between Lat/Long of "A" and Lat/Long "C"+25% of the distance between Lat/Long of A and Lat/Long C.

In one embodiment, in step 403, the image module 303 can retrieve image data depicting a geographic area (e.g., from the aerial image database 225) based on location coordinate data associated with the gap. For instance, the image data can be aerial image data. Although various embodiments are described with respect to aerial images, it is contemplated that the approach described herein may be used with other image data, such as raster graphics, satellite imagery, etc.

Referring back to the example depicted in FIG. 5A, the image module 303 can retrieve an image depicting a geographic area including the area of interest 505. By way of example, the image module 303 can retrieve an aerial image including a probe gap segment using the coordinates of the end points "A", "C", the area 505, etc. For instance, a smaller aerial image can be extracted by the image module 303 from the aerial image for further processing (e.g., to identify one or more end points of a road network depicted in the image data by the image module 303).

Figure 6A:
FIG. 6A is a diagram illustrating an example binary aerial image, according to one embodiment.

In another embodiment, the image module 303 can pre-process/simplify the image data to a gray-scale image, a binary image, etc. For instance, the one or more end points, the road network, or a combination thereof are identified using the binary image with a highlighted road network (e.g., the road network 101). By way of example, FIG. 6A is a diagram illustrating an example binary aerial image 600 including a probe gap segment (e.g., the probe gap segment 501 in FIG. 5A), according to one embodiment. In this example, a smaller binary aerial image 601 in the image 600 (e.g., a given portion of the image 600) was selected for further processing (e.g., by the data processing module 301). For instance, the smaller binary aerial image 601 has a length of 130% of the length "L1" or 120% of the length "L2", as described with respect to FIG. 5A.

In one embodiment, in step 405, the image module 303 can process the image data (e.g., FIG. 6A) to identify one or more end points of a road network depicted in the image data. FIG. 6B is a diagram illustrating side-by-side a smaller binary aerial image (e.g., the smaller binary aerial image 601 within FIG. 6A) and a probe data image 603 (e.g., the probe gap segments of FIG. 5A), according to one embodiment. For instance, the image module 303 can process the smaller binary aerial image 601 of FIG. 6A to identify an end point A and an end point C, as depicted on the left side of FIG. 6B. In one instance, the image module 303 can remove/mask unwanted structures from FIG. 6A, the smaller binary aerial image 601, or a combination thereof in connection with the identification of one or both end points.

In another embodiment, the processing of the image data comprises using a machine learning model (e.g., the machine learning system 125) to detect the road network, the one or more end points, or a combination thereof in aerial image data (e.g., retrieved by the image module 303). For instance, the machine learning model can be trained to remove or to mask one or more non-tunnel-related structures from the aerial image data. For instance, the machine learning system 125 can select respective factors such as one or more summary statistics of aerial imagery map objects (e.g., sizes, locations, relative distances, etc.), to determine one or more map objects, such as open roads, buildings, tunnels, etc. In one embodiment, the training module 309 in connection with the machine learning system 125 can select or assign respective weights, correlations, relationships, etc. among the factors, to determine the tunnel-related objects/structures and/or non-tunnel-related objects/structure in images. In one instance, the training module 309 can continuously provide and/or update a machine learning model (e.g., a support vector machine (SVM), neural network, decision tree, etc.) during training using, for instance, supervised deep convolution networks or equivalents. For instance, such machine learning model can be trained to remove or to mask one or more non-tunnel-related structures from the image data.

In one embodiment, the image module 303 can compare the smaller binary aerial image 601 with the probe data image 603 to obtain a Level 1 output according to Table 1 below (e.g., illustrating Cases 1-5). It is noted that the aerial image data is cross-referenced by the image module 303 for validation and identification purposes to eliminate/disambiguate irrelevant absence of probe data that are not part of a tunnel.

For instance, when there are probe data present in a potential tunnel segment, whether there is a road segment present in the corresponding area in the binary image as in Case 1, or there is no road segment present in the corresponding area in the binary image as in Case 2, the image module 303 determines there is no tunnel in the area and sets a Level 1 output as "No processing." As another instance, when there is no probe data present in a potential tunnel segment, but a road segment is present in the corresponding area in the binary image as in Case 3, the image module 303 can determine that there may be tunnel in the area and set a Level 1 output as "Pseudo segment." As another instance, when there is no probe data present in a potential tunnel segment, and no road segment present in the corresponding area in the binary image as in Case 4, the image module 303 determines there is a tunnel in the area and sets a Level 1 output as "Tunnel segment."

In Cases 1-4, "Present" means 100% probability present, and Absent means 100% probability absent, for simplification. However, a "Present" probability percentage of less than 100% (e.g., 0-99%) or an "Absent" probability percentage of less than 100% (e.g., 0-99%) can exist in reality. By way of example, when there is 90% probability probe data absent in a potential tunnel segment, and 90% probability a road segment absent from the corresponding area in the binary image as in Case 5, the image module 303 can determine that there is a tunnel in the area and can set a Level 1 output as "Tunnel segment."

TABLE 1

| Cases | Probe | Binary Image Road Network | Level 1 output |
| --- | --- | --- | --- |
| Case 1 | Present | Present | No processing |
| Case 2 | Present | Absent | No processing |
| Case 3 | Absent | Present | Pseudo segment |
| Case 4 | Absent | Absent | Tunnel segment |
| Case 5 | 90% Absent | 90% Absent | Tunnel segment |

In another embodiment, the image module 303 can further determine the tunnel start point, the tunnel end point, or a combination thereof based on road link data of a geographic database (e.g., the geographic database 123). For example, the data processing module 301 can process the image data retrieved by the image module 303 to identify one or more tunnel structures in the image data (e.g., the image 600 of FIG. 6A), the tunnel start point, the tunnel end point, or a combination thereof based on an intersection between the road link data and the one or more tunnel structures.

Figure 7:
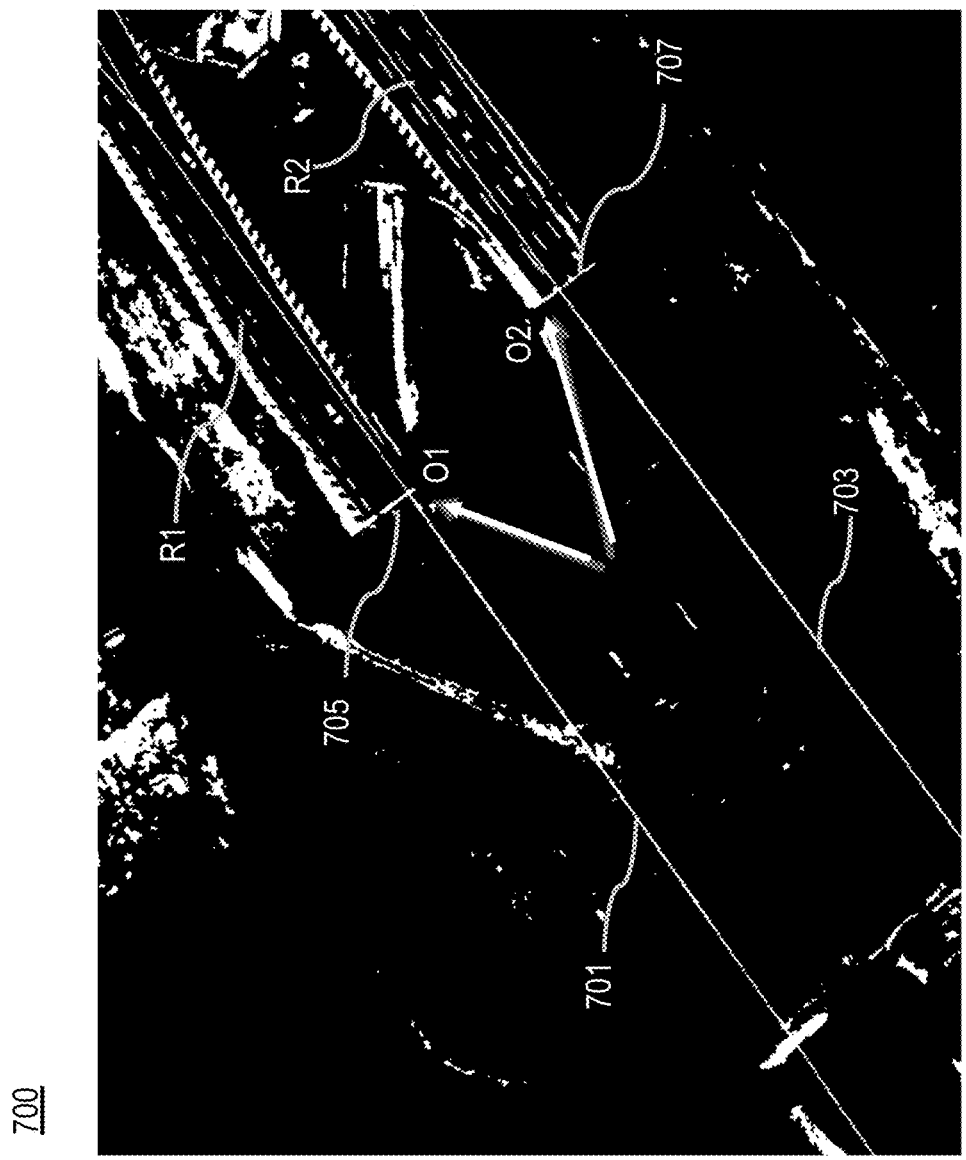
FIG. 7 is a diagram illustrating an example binary aerial image, according to one embodiment.

In one embodiment, in step 407, the image module 303 can locate a tunnel start point, a tunnel end point, or a combination thereof based on the one or more endpoints. FIG. 7 is a diagram illustrating an even smaller binary aerial image 700 (e.g., a portion of the smaller binary aerial image 601), according to one embodiment. By way of example, the image module 303 can locate the tunnel and an open road merging point in the binary aerial image 700 as a precise tunnel start/end point. For instance, in the binary aerial image 700, a point (e.g., "01" or "02") where open road network links 701 and 703 intersect with binary image tunnel structures 705 and 707. In the binary aerial image 700, a road link (e.g., 701 and 703) appears as a white solid line running along a road segment, and a tunnel structure (e.g., 705 and 707) appears as a small vertical line perpendicular to the road link (e.g., 701 and 703) after which a road segment (e.g., R1 and R2) ends/disappears, (i.e., a tunnel start/end point).

In another embodiment, LiDAR (Light Detection and Ranging) data (e.g., collected from the vehicles 103) can be used by the image module 303 in place of or in conjunction with the drive file to verify/confirm the tunnel existence. For instance, the LiDAR data can be used the same way as the drive file data to determine the tunnel existence and/or the tunnel attributes. The LiDAR data can include object/tunnel distances/sizes for creating 3D images of the detected objects/tunnels and the surroundings. The redundancy and overlapping detection/verification capabilities can ensure the accuracy of tunnel and attribute detection.

In one embodiment, the coding module 305 can code the precise tunnel start/end point (e.g., "01", "02", etc.) in one or more maps (e.g., a digital map), one or more databases (e.g., the geographic database 123), etc.

Figure 8:
FIG. 8 is a diagram illustrating an example video drive file, according to one embodiment.

In one embodiment, the image module 303 can retrieve drive imagery (e.g., from the drive file image database 233) based on the tunnel start point, the tunnel end point, or a combination thereof. FIG. 8 is a diagram illustrating an example video drive file, according to one embodiment. By way of example, the video drive file 800 was taken by a vehicle (e.g., a vehicle 103) when driving through the tunnel featured in the video drive file 800.

In one embodiment, the image module 303 can verify the tunnel start point, the tunnel end point, or the combination based on the retrieved drive imagery, as depicted in the example Cases 1-5 of Table 2. The drive file verification process ensures more accurate identification of a tunnel and reduces the likelihood of improper tunnel identification. For example, Table 2 includes all the information of Table 1 as well as two additional columns of information: Tunnel image extracted from a video drive file and Final output. In one embodiment, the verifying of the tunnel start point, the tunnel end point, or a combination thereof by the image module 303 is based on a machine learning model trained (e.g., by the training module 309) to detect a tunnel existence. For instance, the image module 303 can apply machine learning (e.g., using the machine learning system 125) to compare the tunnel start/end point with one or more tunnel images in the drive file to further conclude the tunnel existence and to detect supplementary tunnel attributes in the drive image 800. By way of example, the supplementary tunnel attributes can include a height, a width, a length, an access restriction (e.g., an access time frame, no truck/pedestrian/bicycle access, etc.), a travel restriction (e.g., speed, stop, etc.), or a combination thereof.

TABLE 2

| | Probe | Binary Image Road Network | Level 1 output | Tunnel image from a video drive file | Final Output |
|---|---|---|---|---|---|
| Case 1 | Present | Present | No processing | No processing | Tunnel Absent |
| Case 2 | Present | Absent | No processing | No processing | Tunnel Absent, Bridge underpass or overpass network |
| Case 3 | Absent | Present | Pseudo segment | No processing | Tunnel Absent, Road dead end network |
| Case 4 | Absent | Absent | Tunnel segment | Present | Tunnel present & Code Supplementary attribute |
| Case 5 | 90% Absent | 90% Absent | Tunnel segment | Absent (only when image is missing) | Tunnel present but no supplementary attribute coded |

In Case 1 (as illustrated above), when there are probe data present in a potential tunnel segment, a road segment present in the corresponding area in the binary image, and no tunnel image being extracted from the video drive file, the image module 303 can determine there is no tunnel in the area and set the final output as "Tunnel absent."

In Case 2, when there are probe data present in a potential tunnel segment, a road segment present in the corresponding area in the binary image, and no tunnel image being extracted from the video drive file, the image module 303 can determine there is no tunnel in the area and set the final output as "Tunnel absent, Bridge underpass or overpass present." In Case 2, the machine learning model (e.g., the machine learning system 125) can be further trained (e.g., by the training module 309) to distinguish between a tunnel existence and an existence of a bridge underpass or an overpass network.

In Case 3, when there is no probe data present in a potential tunnel segment and no tunnel image being extracted from the video drive file, but a road segment is present in the corresponding area in the binary image, the image module 303 can determine there is no tunnel in the area and set the final output as "Tunnel absent, Road dead end present."

In Case 4, when there is no probe data present in a potential tunnel segment, no road segment present in the corresponding area in the binary image, and a tunnel image being extracted from the video drive file, the image module 303 can determine there is a tunnel in the area and set the final output as "Tunnel segment & Code Supplementary attribute."

In Case 5, when there is 90% probability probe data absent in a potential tunnel segment, and 90% probability a road segment is absent from the corresponding area in the binary image, but tunnel images are missing from the video drive file, the image module 303 can determine there is a tunnel in the area and set the final output as "Tunnel segment but no supplementary attribute coded."

In one embodiment, the coding module 305 can code a supplementary tunnel attribute detected in the drive imagery. In one embodiment, the machine learning model (e.g., the machine learning system 125) can be further trained (e.g., by the training module 309) to code the supplementary tunnel attribute detected in the drive imagery.

For instance, the machine learning system 125 can select respective factors such as one or more summary statistics of drive imagery map objects (e.g., sizes, locations, relative distances, etc.), to determine one or more tunnel feature objects, such as tunnel walls, signages, lights, etc. In one embodiment, the training module 309 in connection with the machine learning system 125 can select or assign respective weights, correlations, relationships, etc. among the factors, to determine the tunnel-related objects/features and/or non-tunnel-related objects/features in drive file images. In one instance, the training module 309 can continuously provide and/or update a machine learning model (e.g., a SVM, neural network, decision tree, etc.) during training using, for instance, supervised deep convolution networks or equivalents. For instance, such machine learning model can be trained (e.g., by the training module 309) to detect tunnel structures and/or attributes from the drive file image data.

In one embodiment, the machine learning system 125 can improve the process for detecting and map-coding a tunnel using feedback loops based on, for example, user/vehicle behavior and/or feedback data (e.g., from sensor data, other image data, etc.). In one embodiment, the machine learning system 125 can improve the above-discussed machine learning models using user/vehicle behavior and/or feedback data as training data. For example, the machine learning system 125 can analyze detected/verified tunnel and attribute data, missed tunnel and attribute data, etc. to determine and to improve upon the performance of the machine learning models.

In one embodiment, in step 409, the output module 307 can provide the tunnel start point, the tunnel end point, or a combination thereof as a map data output. For example, the map data output may be used in connection with one or more navigation services (e.g., services 117a-117n) to improve the navigation of one or more vehicles 103 (e.g., an autonomous vehicle) traveling through the road network 101.

In one embodiment, the output module 307 can generate a network geometry topology including tunnel path data. For the purpose of illustration herein, the network geometry topology defines the arrangement of and/or relationship between the various links and/or nodes surrounding the tunnel for which the probe data was gathered. As such, the network geometry topology may be depicted physically or logically and maintained as a dataset in association with a unique identifier of the tunnel via the geographic database 123. The tunnel identifier may be established by content providers 119a-119m (also collectively referred to herein as content providers 119), the mapping platform 107 or the geographic database 123 for enabling subsequent cross referencing, matching and validation of the map data, as well as supporting navigation services.

Figure 9A:
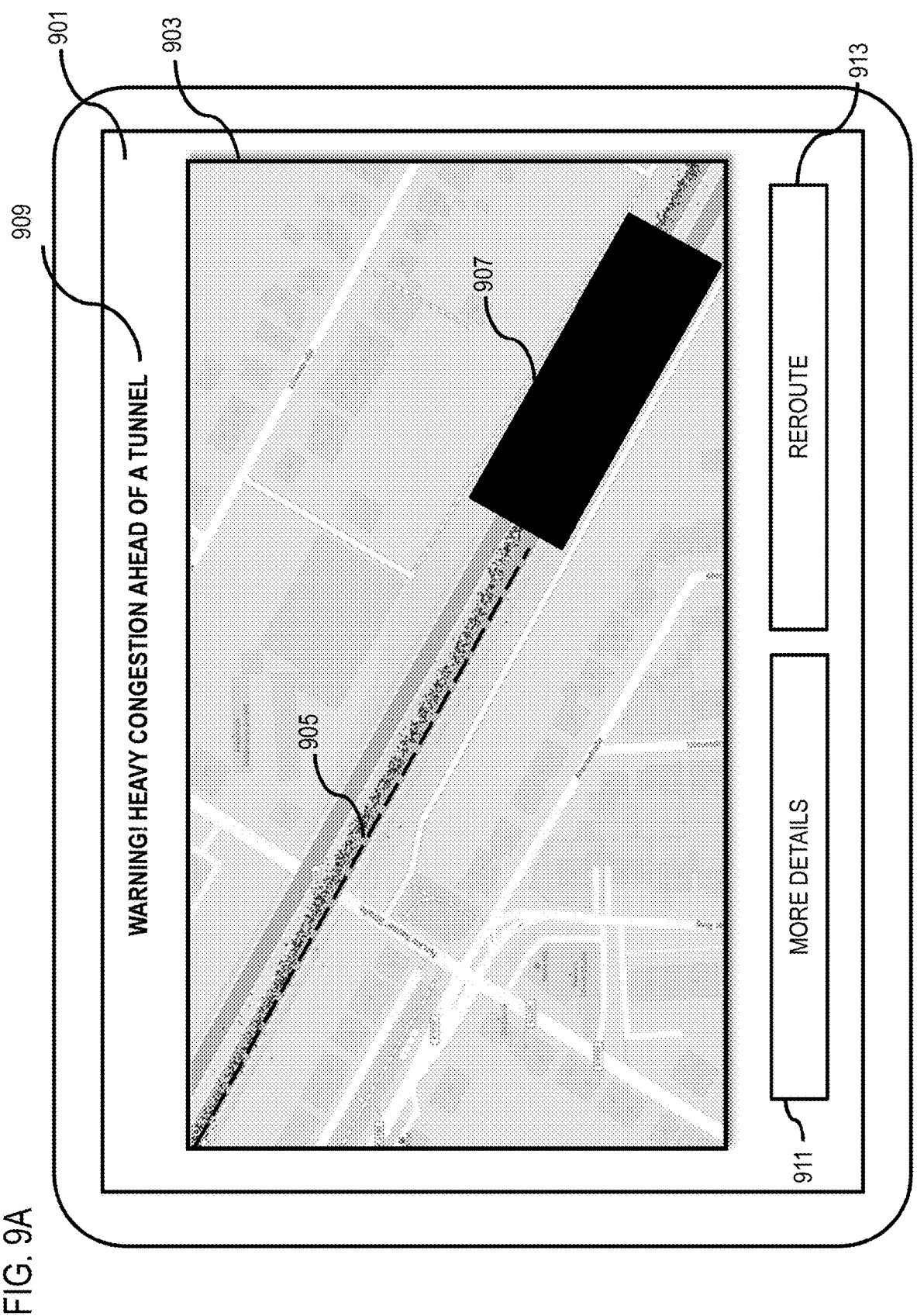
FIGS. 9A and 9B are diagrams of example user interfaces for bypassing a congested tunnel, according to various embodiments.
Figure 9B:
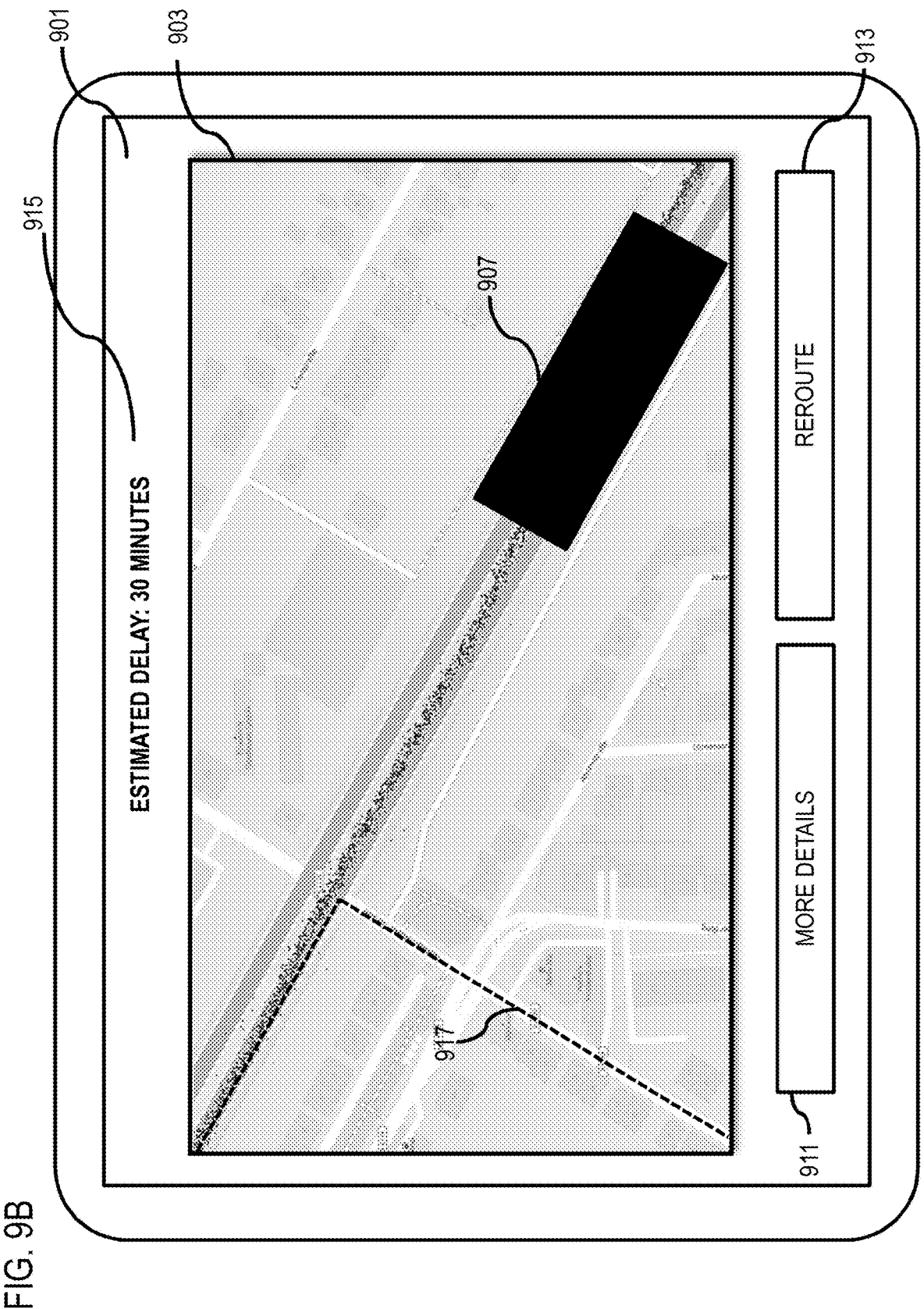

By way of example, FIGS. 9A and 9B are diagrams of example user interfaces for bypassing a congested tunnel, according to various embodiments. Referring to FIG. 9A, in one embodiment, the system 100 can generate a user interface (UI) 901 (e.g., a navigation application 113) for a UE 111 (e.g., a mobile device, an embedded navigation system, etc.) that can enable a user (e.g., a driver of a vehicle 103) or a vehicle 103 (e.g., an autonomous vehicle) to bypass a congested tunnel while traveling (e.g., the road network 101). In one instance, the system 100 can generate the UI 901 such that it includes a map 903, a route 905 leading to a tunnel 907, and an alert 909: "Warning! Heavy Congestion ahead of a Tunnel." In this example, the system 100 can also generate the UI 901 such that it includes an input 911 (e.g., "More Details") and an input 913 (e.g., "Reroute"). For example, a user can interact with the user interface 901, the various inputs described with respect to FIGS. 9A and 9B (e.g., inputs 911 and 913), or a combination thereof via one or more physical interactions (e.g., a touch, a tap, a gesture, typing, etc.), one or more voice commands (e.g., "show estimated delay," "flag road closure," etc.), or a combination thereof.

In one instance, when a user interacts with the input 911 (e.g., "More Details"), the system 100 can generate the user interface 901 such that it shows an alert 915: "Estimated Delay: 30 minutes," as depicted in FIG. 9B. In another example, when the user interacts with the input 913 (e.g., "Reroute"), the system 100 can generate the UI 901 such that it shows a new route 917 that can enable the user and/or a vehicle 103 to bypass the tunnel 907. It is contemplated that in this instance, the system 100 can determine or detect one or more actions by a user (e.g., an eye gaze) and automatically confirm the interaction. This is particularly useful in the case of a passenger in an autonomous or semi-autonomous vehicle 103.

Returning to FIG. 1, in one embodiment, the mapping platform 107 performs the process for detecting and mapcoding a tunnel based on probes and image data as discussed with respect to the various embodiments described herein. For example, the mapping platform 107 can generate road segment related features for machine learning solutions (e.g., using the machine learning system 125).

In one embodiment, the mapping platform 107 has connectivity over the communications network 109 to the services platform 115 (e.g., an OEM platform) that provides the services 117a-117n (also collectively referred to herein as services 117) (e.g., probe and/or sensor data collection services). By way of example, the services 117 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 115 uses the output (e.g. whether a road segment is closed or not) of the mapping platform 107 to provide services such as navigation, mapping, other location-based services, etc.

In one embodiment, the mapping platform 107 may be a platform with multiple interconnected components. The mapping platform 107 may include multiple servers, intelligent networking devices, computing devices, components, and corresponding software for providing parametric representations of lane lines. In addition, it is noted that the mapping platform 107 may be a separate entity of the system 100, a part of the services platform 115, a part of the one or more services 117, or included within a vehicle 103 (e.g., an embedded navigation system).

In one embodiment, content providers 119 may provide content or data (e.g., including road closure reports, probe data, expected vehicle volume data, etc.) to the mapping platform 107, the UEs 111, the applications 113, the services platform 115, the services 117, the probe data layer 121, the geographic database 123, and the vehicles 103. The content provided may be any type of content, such as map content, textual content, audio content, video content, image content, etc. In one embodiment, the content providers 119 may provide content regarding the expected frequency of vehicles 103 on the digital map or link as well as content that may aid in localizing a vehicle path or trajectory on a digital map or link (e.g., to assist with determining actual vehicle volumes on a road network). In one embodiment, the content providers 119 may also store content associated with the mapping platform 107, the services platform 115, the services 117, the probe data layer 121, the geographic database 123, and/or the vehicles 103. In another embodiment, the content providers 119 may manage access to a central repository of data, and offer a consistent, standard interface to data, such as a repository of the probe data layer 121 and/or the geographic database 123.

By way of example, the UEs 111 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 111 can support any type of interface to the user (such as "wearable" circuitry, etc.). In one embodiment, a UE 111 may be associated with a vehicle 103 (e.g., a mobile device) or be a component part of the vehicle 103 (e.g., an embedded navigation system). In one embodiment, the UEs 111 may include the mapping platform 107 to detect and map-code a tunnel based on probes and image data.

In one embodiment, as mentioned above, the vehicles 103, for instance, are part of a probe-based system for collecting probe data for detecting actual and expected vehicle volumes on a road network and/or measuring traffic conditions in the road network 101 (e.g., free flow traffic versus a road closure). In one embodiment, each vehicle 103 is configured to report probe data as probes, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) source ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 103 may include vehicle sensors 105 for reporting measuring and/or reporting attributes. The attributes can also be any attribute normally collected by an on-board diagnostic (OBD) system of the vehicle 103, and available through an interface to the OBD system (e.g., OBD II interface or other similar interface).

The probes can be reported from the vehicles 103 in real-time, in batches, continuously, or at any other frequency requested by the system 100 over, for instance, the communication network 109 for processing by the mapping platform 107. The probes also can be map matched to specific road links stored in the geographic database 123. In one embodiment, the system 100 (e.g., via the mapping platform 107) generates vehicle paths or trajectories from the observed and expected frequency of probes for an individual probe as discussed with respect to the various embodiments described herein so that the probe traces represent a travel trajectory or vehicle path of the probe through the road network 101.

In one embodiment, as previously stated, the vehicles 103 are configured with various sensors (e.g., vehicle sensors 105) for generating or collecting probe data, sensor data, related geographic/map data, etc. In one embodiment, the sensed data represents sensor data associated with a geographic location or coordinates at which the sensor data was collected (e.g., a latitude and longitude pair). In one embodiment, the probe data (e.g., stored in the probe data layer 121) includes location probes collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103, switch sensors for determining whether one or more vehicle switches are engaged, and the like. Though depicted as automobiles, it is contemplated the vehicles 103 can be any type of vehicle manned or unmanned (e.g., cars, trucks, buses, vans, motorcycles, scooters, drones, etc.) that travels through road segments of a road network (e.g., road network 101).

Other examples of sensors 105 of a vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 103 along a path of travel, moisture sensors, pressure sensors, etc. In a further example embodiment, vehicle sensors 105 about the perimeter of a vehicle 103 may detect the relative distance of the vehicle 103 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, a vehicle 103 may include GPS or other satellite-based receivers to obtain geographic coordinates from satellites 127 for determining current location and time. Further, the location can be determined by visual odometry, triangulation systems such as A-GPS, Cell of Origin, or other location extrapolation technologies.

In one embodiment, the UEs 111 may also be configured with various sensors (not shown for illustrative convenience) for acquiring and/or generating probe data and/or sensor data associated with a vehicle 103, a driver, a passenger, other vehicles, conditions regarding the driving environment or roadway, etc. For example, such sensors may be used as GPS receivers for interacting with the one or more satellites 127 to determine and track the current speed, position, and location of a vehicle 103 travelling along a link or road segment. In addition, the sensors may gather tilt data (e.g., a degree of incline or decline of the vehicle during travel), motion data, light data, sound data, image data, weather data, temporal data and other data associated with the vehicles 103 and/or UEs 111. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 109 as probe data (e.g., GPS probe data) according to any known wireless communication protocols. For example, each UE 111, application 113, user, and/or vehicle 103 may be assigned a unique probe identifier (probe ID) for use in reporting or transmitting the probe data collected by the vehicles 103 and/or UEs 111. In one embodiment, each vehicle 103 and/or UE 111 is configured to report probe data as probes, which are individual data records collected at a point in time that records telemetry data.

In one embodiment, the mapping platform 107 retrieves aggregated probes gathered and/or generated by the vehicle sensors 105 and/or the UEs 111 resulting from the travel of the UEs 111 and/or vehicles 103 on a road segment of a road network (e.g., the road network 101). In one instance, the probe data layer 121 stores a plurality of probes and/or trajectories generated by different vehicle sensors 105, UEs 111, applications 113, vehicles 103, etc. over a period while traveling in a large, monitored area (e.g., the road network 101). A time sequence of probes specifies a trajectory—i.e., a path traversed by a UE 111, application 113, vehicle 103, etc. over the period.

In one embodiment, the communication network 109 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, vehicle sensors 105, mapping platform 107, UEs 111, applications 113, services platform 115, services 117, content providers 119, and/or satellites 127 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
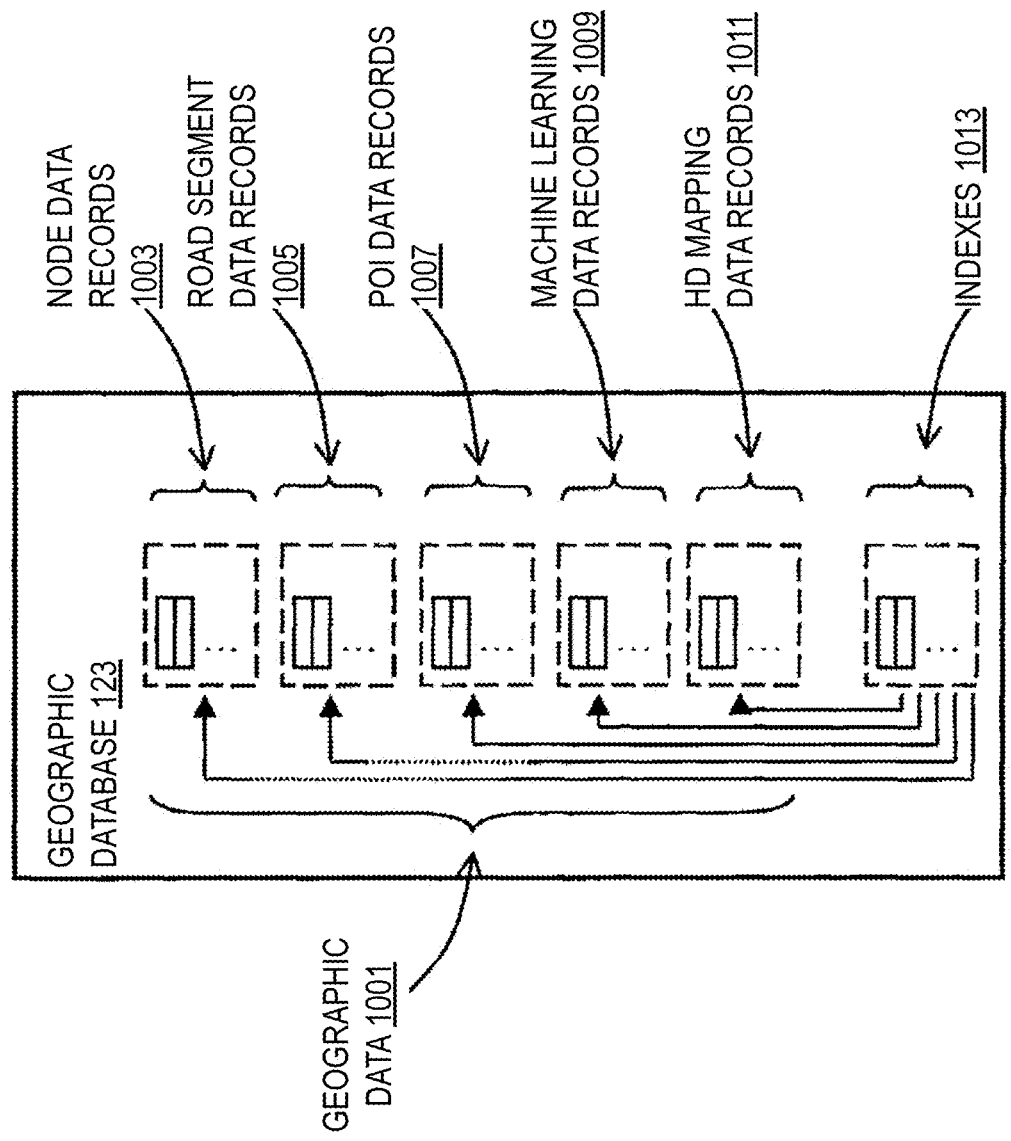
FIG. 10 is a diagram of a geographic database, according to one embodiment.

FIG. 10 is a diagram of a geographic database (such as the database 123), according to one embodiment. In one embodiment, the geographic database 123 includes geographic data 1001 used for (or configured to be compiled to be used for) mapping and/or navigation-related services, such as for video odometry based on the parametric representation of lanes include, e.g., encoding and/or decoding parametric representations into lane lines. In one embodiment, the geographic database 123 include high resolution or high definition (HD) mapping data that provide centimeter-level or better accuracy of map features. For example, the geographic database 123 can be based on LiDAR or equivalent technology to collect billions of 3D points and model road surfaces and other map features down to the number lanes and their widths. In one embodiment, the HD mapping data (e.g., HD data records 1011) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 1003, road segment or link data records 1005, POI data records 1007, machine learning data records 1009, HD mapping data records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 123. In one embodiment, the indexes 1013 may be used to quickly locate data without having to search every row in the geographic database 123 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 1007. The geographic database 123 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 123 can also include machine learning data records 1009 for storing training data, prediction models, annotated observations, computed featured distributions, sampling probabilities, and/or any other data generated or used by the system 100 according to the various embodiments described herein. For example, the system 100 can use the machine learning data records 1009 to detect a road network (e.g., the road network 101), one or more end points, or a combination thereof in aerial image data. In one instance, the system 100 (e.g., using the machine learning system 125) can use the machine learning data records 1009 to remove or to mask one or more non-tunnel-related structures from the aerial image data. The system 100 can also, for example, use respective factors such as one or more summary statistics of aerial imagery map objects (e.g., sizes, locations, relative distances, etc.) stored in the machine learning data records 1009 to determine one or more map objects, such as open roads, buildings, tunnels, etc. By way of example, the machine learning data records 1009 can be associated with one or more of the node records 1003, road segment records 1005, and/or POI data records 1007 to support localization or visual odometry based on the features stored therein and the corresponding estimated quality of the features. In this way, the machine learning data records 1009 can also be associated with or used to classify the characteristics or metadata of the corresponding records 1003, 1005, and/or 1007.

In one embodiment, as discussed above, the HD mapping data records 1011 model road surfaces and other map features to centimeter-level or better accuracy. The HD mapping data records 1011 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1011 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 119 in association with the mapping platform 107 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicles 103 and/or user terminals 111) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or a user terminal 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for detecting and map-coding a tunnel based on probes and image data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
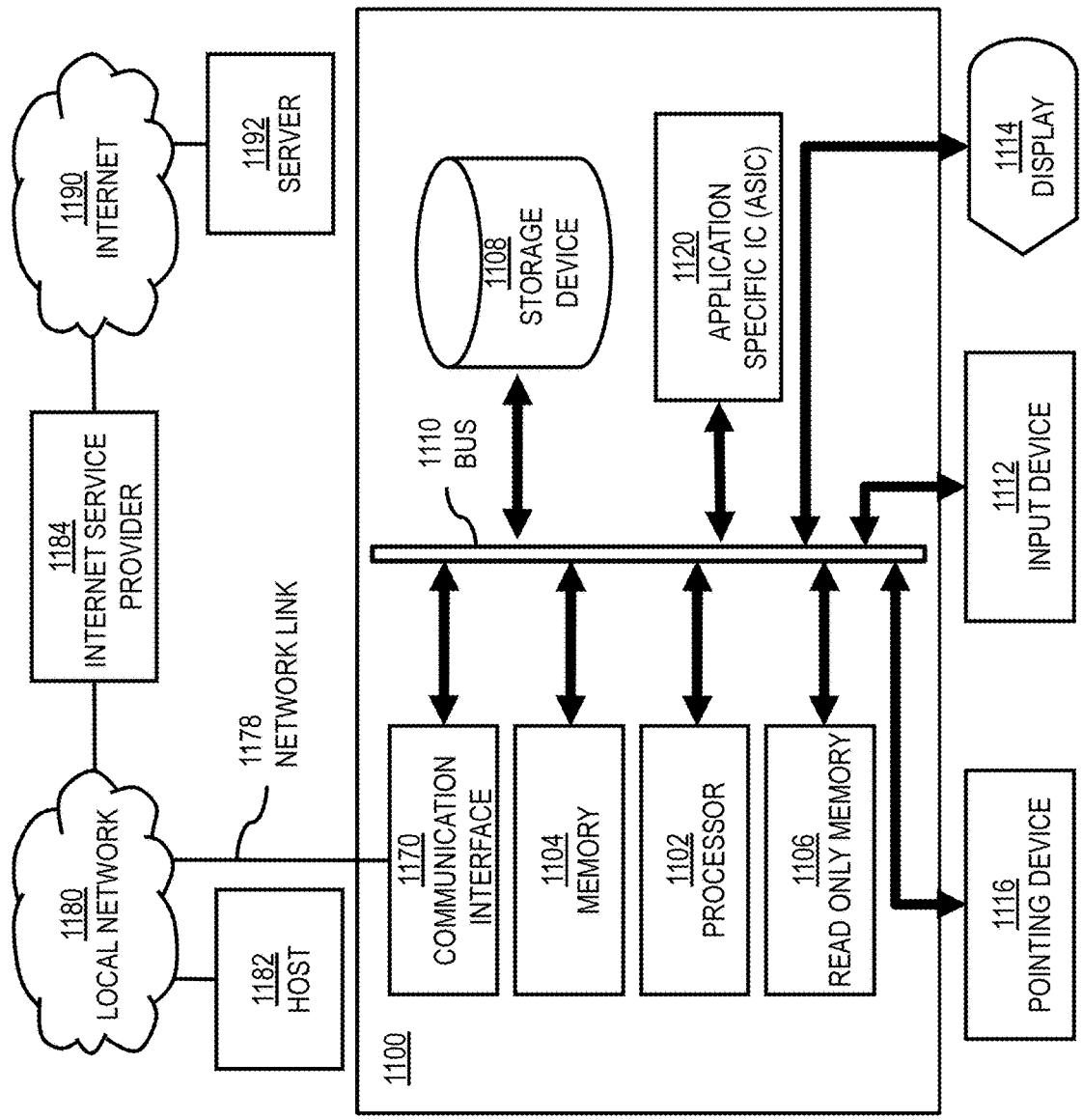
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to detect and map-code a tunnel based on probes and image data as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to detecting and map-coding a tunnel based on probes and image data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RANI) or other dynamic storage device, stores information including processor instructions for detecting and map-coding a tunnel based on probes and image data. Dynamic memory allows information stored therein to be changed by the computer system 1100. RANI allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk, or flash card, for storing information, including instructions, that persists even when the computer system 1100 is turned off or otherwise loses power.

Information, including instructions for detecting and map-coding a tunnel based on probes and image data, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection the vehicles 103 to the communication network 109 for detecting and map-coding a tunnel based on probes and image data.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to detect and map-code a tunnel based on probes and image data as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to detect and map-code a tunnel based on probes and image data. The memory 1205 also stores the data associated with or generated by the execution of the inventive steps.

Figure 13:
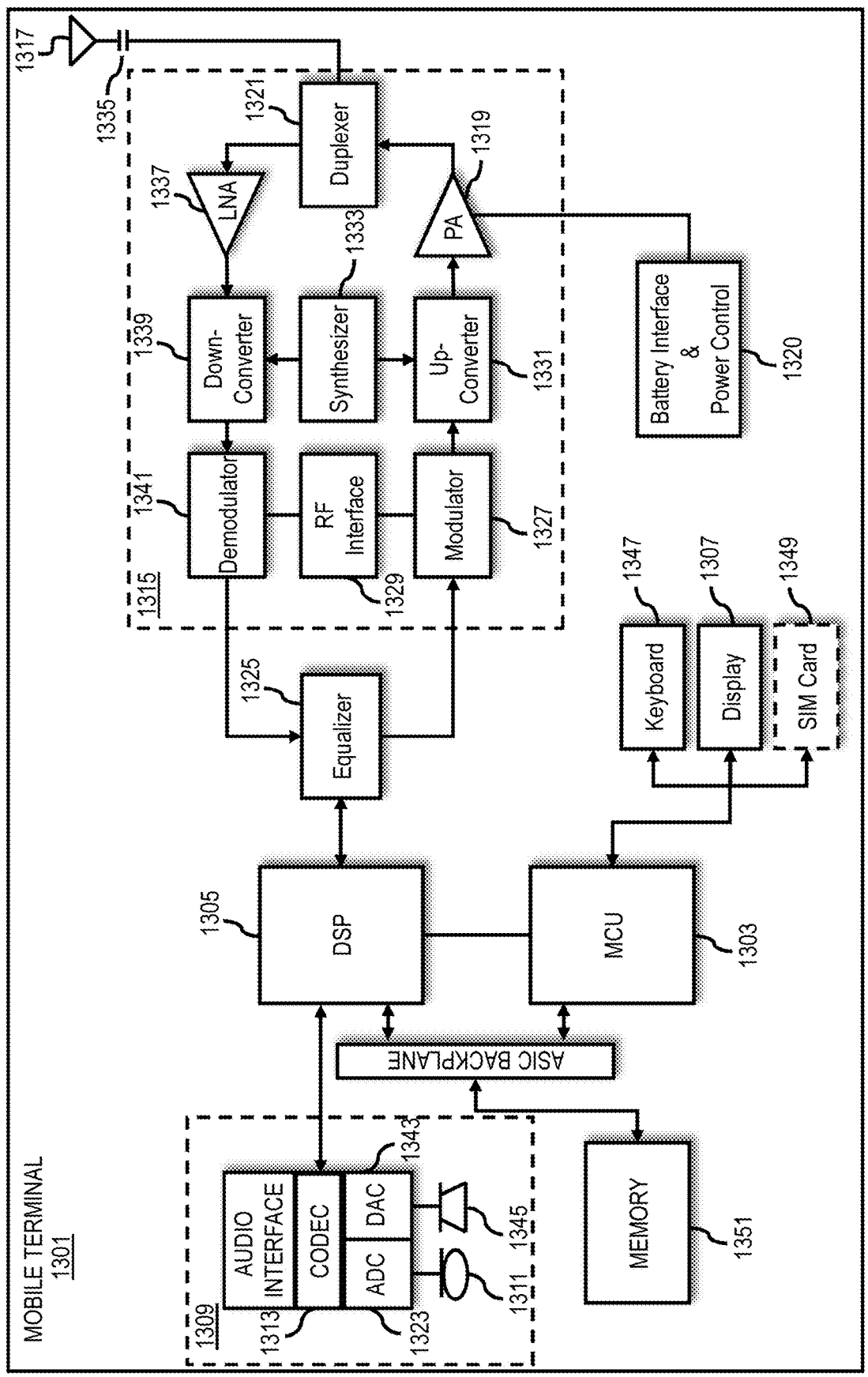
FIG. 13 is a diagram of a mobile terminal (e.g., handset or vehicle or part thereof) that can be used to implement an embodiment.

FIG. 13 is a diagram of exemplary components of a mobile terminal 1301 (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to detect and map-code a tunnel based on probes and image data. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
identifying a gap in probe data collected from one or more location sensors of a plurality vehicles, wherein the gap represents a probe gap segment along which at least one probe point of the probe data does not occur or occurs below a threshold number;
retrieving image data depicting a geographic area based on location coordinate data associated with the gap;
processing the image data to identify one or more end points of a road network depicted in the image data;
locating a tunnel start point, a tunnel end point, or a combination thereof based on the one or more endpoints; and
providing the tunnel start point, the tunnel end point, or a combination thereof as a map data output.

2. The method of claim 1, further comprising:
retrieving drive imagery based on the tunnel start point, the tunnel end point, or a combination thereof; and
verifying the tunnel start point, the tunnel end point, or the combination based on the retrieved drive imagery.

3. The method of claim 2, wherein the verifying of the tunnel start point, the tunnel end point, or a combination thereof is based on a machine learning model trained detect a tunnel existence.

4. The method of claim 3, wherein the machine learning model is further trained to code a supplementary tunnel attribute detected in the drive imagery.

5. The method of claim 3, wherein the machine learning model is further trained to distinguish between a tunnel existence and an existence of a bridge underpass or an overpass network.

6. The method of claim 1, wherein the processing of the image data comprises using a machine learning model to detect the road network, the one or more end points, or a combination thereof.

7. The method of claim 6, wherein the machine learning model is further trained to remove or to mask one or more non-tunnel-related structures from the image data.

8. The method of claim 1, further comprising:
pre-processing the image data using a binary processing unit to convert the image data to a binary image,
wherein the one or more end points, the road network, or a combination thereof are identified using the binary image.

9. The method of claim 1, further comprising:
identifying a start point of the probe gap segment based on determining a first location at which a transmission of the probe data ends; and
identifying an end point of the probe gap segment based on determining a second location at which the transmission of the probe data resumes.

10. The method of claim 1, wherein the tunnel start point, the tunnel end point, or a combination thereof is further based on road link data of a geographic database.

11. The method of claim 10, wherein the processing of the image data further comprises identifying one or more tunnel structures in the image data, and wherein the tunnel start point, the tunnel end point, or a combination thereof is based on an intersection between the road link data and the one or more tunnel structures.

12. The method of claim 1, wherein the image data is aerial image data.

13. An apparatus comprising:
at least one processor; and
at least one memory including computer program code for one or more programs,
the at least one memory and the computer program code configured to, with the at least one processor, cause the apparatus to perform at least the following,
identify a gap in probe data collected from one or more location sensors of a plurality vehicles, wherein the gap represents a probe gap segment along which at least one probe point of the probe data does not occur or occurs below a threshold number;
retrieve image data depicting a geographic area based on location coordinate data associated with the gap;
process the image data to identify one or more end points of a road network depicted in the image data;
locate a tunnel start point, a tunnel end point, or a combination thereof based on the one or more endpoints; and
provide the tunnel start point, the tunnel end point, or a combination thereof as a map data output.

14. The apparatus of claim 13, wherein the apparatus is further caused to:
retrieve drive imagery based on the tunnel start point, the tunnel end point, or a combination thereof; and
verify the tunnel start point, the tunnel end point, or the combination based on the retrieved drive imagery.

15. The apparatus of claim 14, wherein the verifying of the tunnel start point, the tunnel end point, or a combination thereof is based on a machine learning model trained detect a tunnel existence.

16. The apparatus of claim 15, wherein the machine learning model is further trained to code a supplementary tunnel attribute detected in the drive imagery.

17. The apparatus of claim 15, wherein the machine learning model is further trained to distinguish between a tunnel existence and an existence of a bridge underpass or an overpass network.

18. A non-transitory computer readable storage medium including one or more sequences of one or more instructions which, when executed by one or more processors, cause an apparatus to at least perform:
identifying a gap in probe data collected from one or more location sensors of a plurality vehicles, wherein the gap represents a probe gap segment along which at least one probe point of the probe data does not occur or occurs below a threshold number;
retrieving image data depicting a geographic area based on location coordinate data associated with the gap;
processing the image data to identify one or more end points of a road network depicted in the image data;
locating a tunnel start point, a tunnel end point, or a combination thereof based on the one or more endpoints; and
providing the tunnel start point, the tunnel end point, or a combination thereof as a map data output.

19. The non-transitory computer readable storage medium of claim 18, wherein the apparatus is further caused to perform:
retrieving drive imagery based on the tunnel start point, the tunnel end point, or a combination thereof; and
verifying the tunnel start point, the tunnel end point, or the combination based on the retrieved drive imagery.

20. The non-transitory computer readable storage medium of claim 19, wherein the verifying of the tunnel start point, the tunnel end point, or a combination thereof is based on a machine learning model trained detect a tunnel existence.

* * * * *